(12) United States Patent
Tomizawa et al.

(10) Patent No.: US 9,475,518 B2
(45) Date of Patent: Oct. 25, 2016

(54) STEERING DEVICE

(71) Applicant: FUJI JUKOGYO KABUSHIKI KAISHA, Tokyo (JP)

(72) Inventors: Hidehisa Tomizawa, Tokyo (JP); Toshi Ishida, Tokyo (JP); Hiroyuki Ooiwa, Tokyo (JP); Mitsuharu Minami, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 14/636,985

(22) Filed: Mar. 3, 2015

(65) Prior Publication Data

US 2015/0251686 A1    Sep. 10, 2015

(30) Foreign Application Priority Data

Mar. 6, 2014   (JP) .................................. 2014-044282

(51) Int. Cl.
*B62D 3/12* (2006.01)
*F16H 55/28* (2006.01)

(52) U.S. Cl.
CPC ............... *B62D 3/123* (2013.01); *F16H 55/28* (2013.01); *F16H 55/283* (2013.01); *Y10T 74/19623* (2015.01)

(58) Field of Classification Search
CPC .............................. B62D 3/123; F16H 55/283
See application file for complete search history.

(56) References Cited

U.S. PATENT DOCUMENTS

| 6,119,540 A   * | 9/2000 | Phillips ................... B62D 3/123 384/42 |
| 6,619,420 B1    | 9/2003 | Saarinen |
| 2002/0124670 A1* | 9/2002 | Bugosh .................. B62D 3/123 74/388 PS |
| 2007/0163375 A1* | 7/2007 | Counts ................... B62D 3/123 74/422 |
| 2011/0175311 A1* | 7/2011 | Tanaka .................... B62D 3/123 280/93.514 |
| 2014/0013901 A1* | 1/2014 | Urbach ................. F16H 55/283 74/606 R |

FOREIGN PATENT DOCUMENTS

| JP | 55-068472 A  | 5/1980 |
| JP | 2002-240723 A | 8/2002 |
| JP | 2007-290502 A | 11/2007 |
| JP | 2012-218512 A | 11/2012 |

* cited by examiner

*Primary Examiner* — Terence Boes
(74) *Attorney, Agent, or Firm* — McDermott Will & Emery LLP

(57) ABSTRACT

A steering device includes: a rack; a pinion; a pinion shaft having the pinion on an outer circumferential surface thereof; a rack shaft having the rack that engages with the pinion; a rack guide that is provided on a side of the rack shaft opposite from the pinion shaft and guides the rack shaft along an axis of the rack shaft; a biasing member that biases the rack guide against the rack shaft to press the rack against the pinion; a guide housing that accommodates the rack guide and the biasing member; and a buffer member provided between an outer circumferential surface of the rack guide and an inner circumferential surface of the guide housing. The buffer member has a cylindrical member and an elastic member. The elastic member is disposed on at least either one of an inner circumferential surface and an outer circumferential surface of the cylindrical member.

12 Claims, 6 Drawing Sheets

STEERING DEVICE

CROSS-REFERENCE TO RELATED APPLICATION

The present application claims priority from Japanese Patent Application No. 2014-044282 filed on Mar. 6, 2014, the entire contents of which are hereby incorporated by reference.

BACKGROUND

1. Technical Field

The present disclosure relates to a steering device.

2. Related Art

Conventionally, an O-ring is disposed on an outer circumferential surface of a rack retainer. Thus, when a rack bar returns to its initial position after being moved by a steering operation, an axis of the rack retainer which engages with the rack bar is maintained so as to be aligned with an axis of a housing as much as possible (see, for example, as an invention disclosed in Japanese Unexamined Patent Application Publication (JP-A) No. 2012-218512).

However, in the conventional structure, the shape of the O-ring may remain in a state in which the shape is influenced by a previous steering operation when steering operations are successively performed. Therefore, a difference may be caused in steering feel between a case where the steering operation goes on in the same direction and a case where the steering operation turns into the opposite direction.

SUMMARY OF THE INVENTION

Thus, a purpose of the present disclosure is to provide a steering device that does not disturb a smooth steering operation, and does not cause or is difficult to cause a difference in steering feel between turning and turning back of a steering wheel.

According to one aspect of the present disclosure, a steering device is provided that includes a rack and a pinion. The steering device also includes a pinion shaft having the pinion on an outer circumferential surface thereof, a rack shaft having the rack that engages with the pinion, a rack guide that is provided on a side of the rack shaft opposite from the pinion shaft and guides the rack shaft along an axis of the rack shaft, a biasing member that biases the rack guide against the rack shaft to press the rack against the pinion, a guide housing that accommodates the rack guide and the biasing member, and a buffer member provided between an outer circumferential surface of the rack guide and an inner circumferential surface of the guide housing. The buffer member has a cylindrical member and an elastic member. The elastic member is disposed on at least either one of an inner circumferential surface and an outer circumferential surface of the cylindrical member.

The elastic member may be mounted to the inner circumferential surface of the cylindrical member, and may contact the outer circumferential surface of the rack guide.

The elastic member may be mounted to the outer circumferential surface of the cylindrical member, and the inner circumferential surface of the cylindrical member may contact the outer circumferential surface of the rack guide.

The cylindrical member may have a first small-diameter cylindrical member and a second large-diameter cylindrical member. The first cylindrical member may be disposed inside the second cylindrical member. The elastic member may be mounted between an outer circumferential surface of the first cylindrical member and an inner circumferential surface of the second cylindrical member.

The elastic member may be disposed near a contacting part of the rack guide with the rack shaft.

The elastic member may be disposed along an axis of the rack guide.

The elastic member may be fixed to the cylindrical member by vulcanization.

The elastic member may include a first elastic member, and a second elastic member having an modulus of elasticity smaller than that of the first elastic member. The second elastic member may be disposed on the pinion shaft side and the rack shaft side with respect to the first elastic member.

BRIEF DESCRIPTION OF THE DRAWINGS

The present disclosure is illustrated by way of example and not by way of limitation in the figures of the accompanying drawings, in which the like reference numerals indicate like elements and in which:

FIG. 6A is a schematic diagram illustrating end faces of the rack guide and the buffer member, FIG. 6B is a cross-sectional view taken along a line X-X of FIG. 6A, and FIG. 6C is a cross-sectional view taken along a line Y-Y of FIG. 6A.

DETAILED DESCRIPTION

A steering device according to the present disclosure is applicable to any vehicles that require a steering operation, and is provided with a steering mechanism having a pinion and a rack. Hereinafter, one example of the steering device according to the present disclosure is described with reference to the accompanying drawings.

Figure 1:
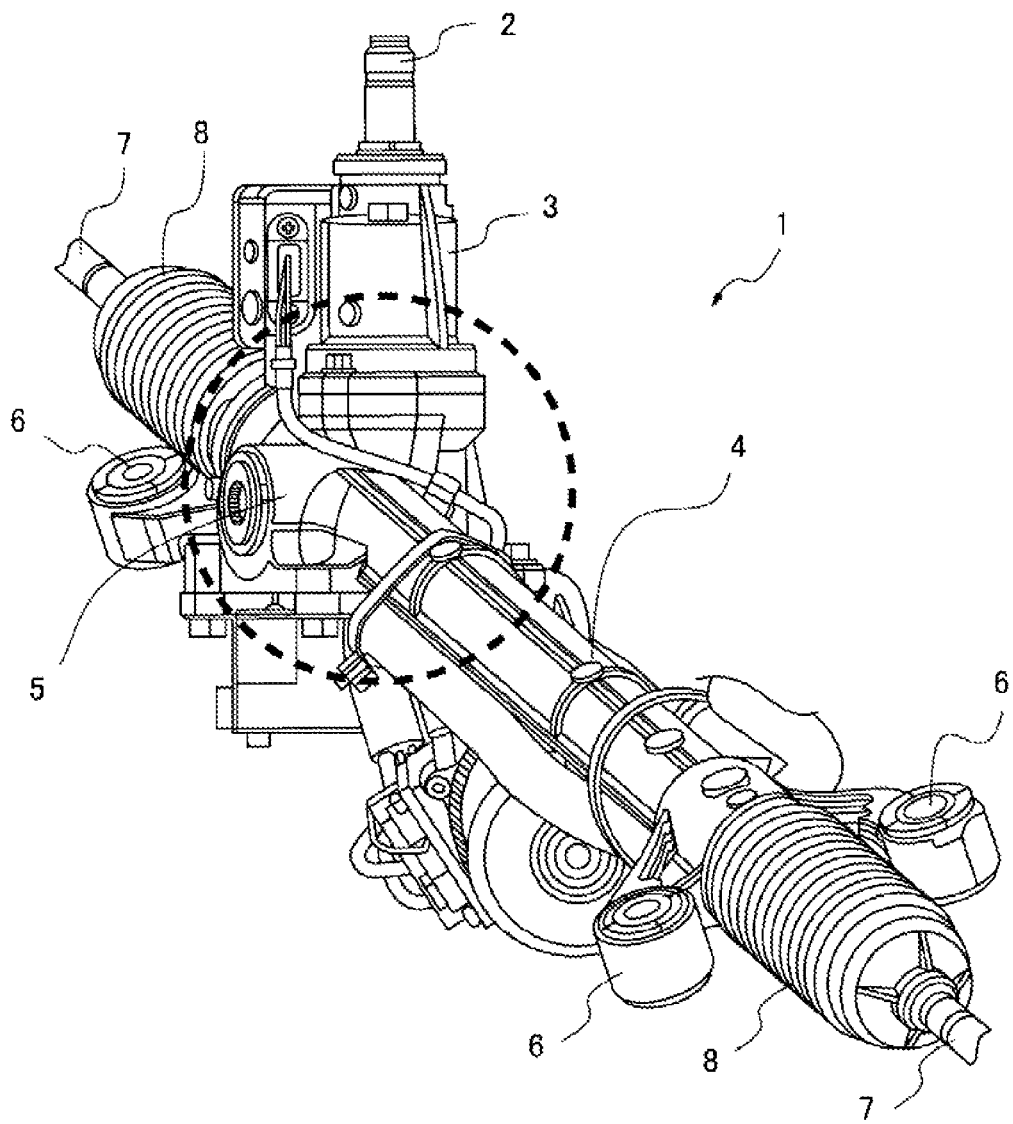
FIG. 1 is a perspective view illustrating one example of a steering device according to the present disclosure.

FIG. 1 is a perspective view partially illustrating a steering device 1 that is one example of the steering device according to the present disclosure.

As illustrated in FIG. 1, the steering device 1 includes a pinion shaft 2, a pinion housing 3, a rack housing 4, a guide housing 5, fixed parts 6, tie rods 7, and boots 8.

The pinion shaft 2 is a shaft body having a substantially circular pillar shape. The pinion shaft 2 is connected at one end with a steering wheel, a steering column, and a suitable coupling member (none of them is illustrated), and a pinion (not illustrated in FIG. 1) is formed around an outer circumferential surface of the other end. The pinion shaft 2 is a member rotatable about the center axis thereof when a steering operation is performed by rotating or turning the steering wheel.

The pinion housing 3 is a cylindrical casing that partially accommodates the other end part of the pinion shaft 2 where the pinion is formed. The rack housing 4 is a cylindrical casing that extends in width directions of a vehicle body where the steering device 1 is disposed, and through which a rack shaft (not illustrated in FIG. 1) is inserted. The guide housing 5 is a cylindrical casing that accommodates a rack guide (not illustrated in FIG. 1). The pinion housing 3, the rack housing 4, and the guide housing 5 cross at one location, and are formed integrally. Note that an internal structure of the crossing part will be described later with reference to FIG. 2.

The rack housing 4 is provided with multiple fixed parts 6, The fixed part 6 is a member for fixedly mounting the steering device 1 to part of a constituent member of the vehicle body (for example, a cross member) by a suitable fastener.

Each tie rod 7 is a shaft body coupled to each of both ends of the rack shaft that is inserted in the rack housing 4. The axes of the tie rods 7 and the axis of the rack shaft are substantially aligned with each other. Similar to the extending directions of the rack housing 4, the tie rods 7 extend in the width directions of the vehicle body, and are connected to left and right front wheels via suitable coupling members. When a steering operation is performed, the tie rods 7 move together with the rack shaft in one of the width directions of the vehicle body along their axes to steer the left and right front wheels and, thus, the traveling direction of the vehicle can be changed as a result. The boots 8 are members wrapping around coupling parts between the tie rods 7 and the rack shaft.

Figure 2:
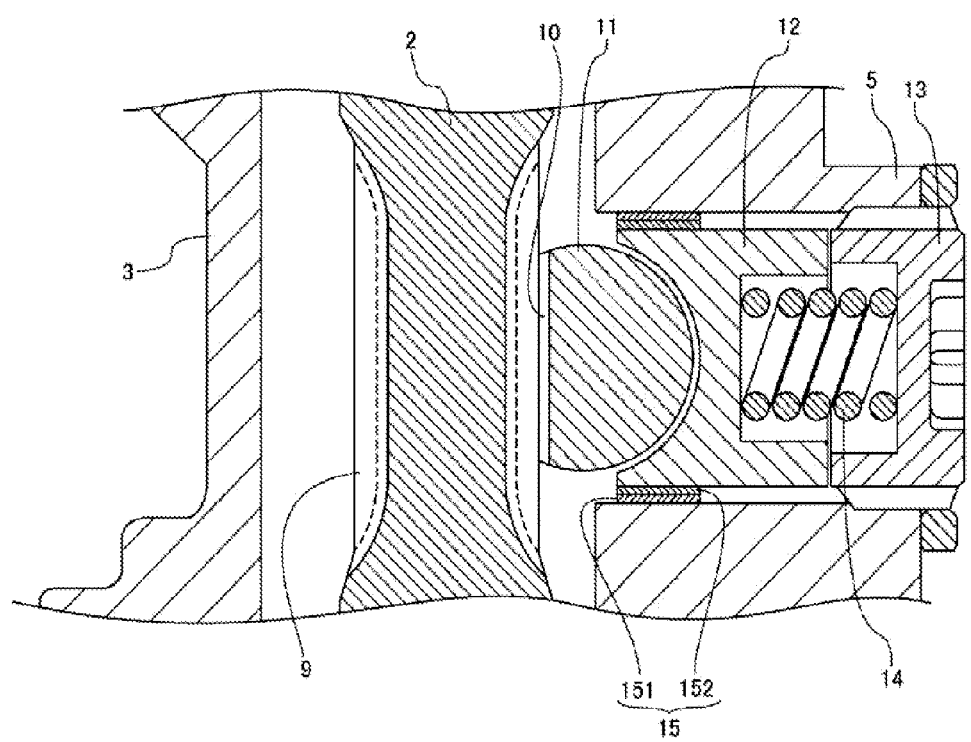
FIG. 2 is partially enlarged cross-sectional view of the steering device illustrated in FIG. 1.

FIG. 2 illustrates a schematic cross-sectional view of part enclosed by a dashed line in FIG. 1, i.e., the part where the pinion housing 3, the rack housing 4, and the guide housing 5 cross. Note that the cross-sectional view illustrating in FIG. 2 is obtained by cutting the steering device 1 along the axes of the pinion housing 3 and the guide housing 5.

As illustrated in FIG. 2, the pinion housing 3 and the guide housing 5 are substantially perpendicular to each other, and they are formed integrally. The pinion shaft 2 having a center axis that is aligned with the axis of the pinion housing 3 is disposed in the pinion housing 3. A pinion 9 is formed on an outer circumferential surface of the pinion shaft 2 at the crossing part with the guide housing 5.

The rack shaft 11 having a rack 10 that engages with the pinion 9 is disposed so that it extends and intersects perpendicularly with the axis of the pinion shaft 2. The rack shaft 11 is a bar member having a substantially circular cross-sectional shape, and the rack 10 are linearly formed on part of the outer circumferential surface of the rack shaft 11. When the pinion shaft 2 rotates by a steering operation, the rack shaft 11 can move along the axis thereof by the engagement between the pinion 9 and the rack 10. That is, the rack shaft 11 is movable perpendicularly (i.e., toward the viewer of the drawing or away from the viewer) to the drawing sheet of FIG. 2.

Note that characteristics of the gears, such as the number of teeth, the pitch, and the teeth forming direction of the pinion 9 and the rack 10 can be suitably selected considering, for example, the type of vehicle to which the steering device 1 is applied, the service condition of the applied vehicle, the movable ranges of the steering wheel and the front wheels, etc.

The rack guide 12 contacts the outer circumferential surface of the rack shaft 11, on the opposite side from the side where the rack 10 that engages with the pinion 9 is formed. The rack guide 12 is a member that guides the movable rack shaft 11, and is disposed inside the guide housing 5.

The guide housing 5 is formed so as to project from the pinion housing 3 near the crossing part between the pinion shaft 2 and the rack shaft 11 and from the rack housing 4 illustrated in FIG. 1, and extends in a direction from the rack shaft 11 toward the pinion shaft 2. An end cap member 13 is fixedly mounted to an outside opening of the guide housing 5 so that the outside opening is closed. The rack guide 12 and the end cap member 13 are serially disposed inside the guide housing 5 from the outside opening of the guide housing 5, and a coil spring 14 is disposed between the rack guide 12 and the end cap members 13. Note that the coil spring 14 is one example of a biasing member of the steering device according to the present disclosure. In the present disclosure, for example, a leaf spring, a pneumatic spring, or a volute spring may also be used, other than the coil spring 14.

Since the end cap member 13 is fixed to the guide housing 5, the biasing force of the coil spring 14 acts so that it presses the rack guide 12 against the outer circumferential surface of the rack shaft 11. Thereby, the rack guide 12 presses the rack 10 toward the pinion 9. Since the rack 10 is pressed against the pinion 9, the engaging state of the rack 10 and the pinion 9 is maintained at any situations before, during, and after a steering operation.

Although the rack guide 12 may directly contact the outer circumferential surface of the rack shaft 11, a smooth steering operation is securable by interposing a member that reduces friction of the contacting parts.

The rack guide 12 is formed by cutting a column body so that one end part thereof is formed in a curved surface along the outer circumferential surface of the rack shaft 11 and the other end part is formed in a recess so that the coil spring 14 contacts stably. A buffer member 15 surrounding the rack guide 12 is disposed on the outer circumferential surface of the rack guide 12.

The buffer member 15 has a cylindrical member 151 and an elastic member 152. The cylindrical member 151 is a cylindrical body surrounding the outer circumferential surface of the rack guide 12 and is made of metal or synthetic resin. The elastic member 152 is a cylindrical body made of suitable elastic material, and is fixedly mounted to the inner circumferential surface of the cylindrical member 151. The buffer member 15 is a member having part that can absorb an impact like the elastic member 152 when external stress acts to the buffer member 15. For example, in the example illustrated in FIG. 2, when arbitrary stress acts to the buffer member 15 from the rack guide 12 that the buffer member 15 contacts, the stress can be absorbed, for example, by the elastic member 152 being deformed. Note that, if the elastic member 152 is made of elastic material, such as elastomer, the elastic member 152 can be formed and fixedly adhered to the cylindrical member 151 at the same time by vulcanizing unvulcanized material of the elastic member 152, pressing the elastic member 152 against the cylindrical member 151, and suitably heating the members. Alternatively, a fixing method other than the vulcanization may also be adopted. For example, pressure bonding or melt bonding may be adopted, or a method of forming a groove or an engaged part in the cylindrical member, while forming a protrusion or an engaging part in part of the elastic member to mechanically fix the members may also be adopted.

As illustrated in FIG. 2, the buffer member 15 is disposed along the outer circumferential surface of the rack guide 12, near the contacting part to the rack shaft 11 in one end part of the rack guide 12. The inner circumferential surface of the elastic member 152 of the buffer member 15 that is disposed radially inward contacts the outer circumferential surface of the rack guide 12, and the outer circumferential surface of the cylindrical member 151 that is disposed radially outward contacts the inner circumferential surface of the guide housing 5. Since a gap between the outer circumferential surface of one end part of the rack guide 12 and the inner circumferential surface of the guide housing 5 can be filled by providing the buffer member 15, the rack guide 12 is biased against the rack shaft 11 in the guide housing 5 without backlash. Next, behaviors of the rack shaft 11, the rack guide 12, and the buffer member 15 are described with reference to FIGS. 3A and 3B.

Figure 3A:
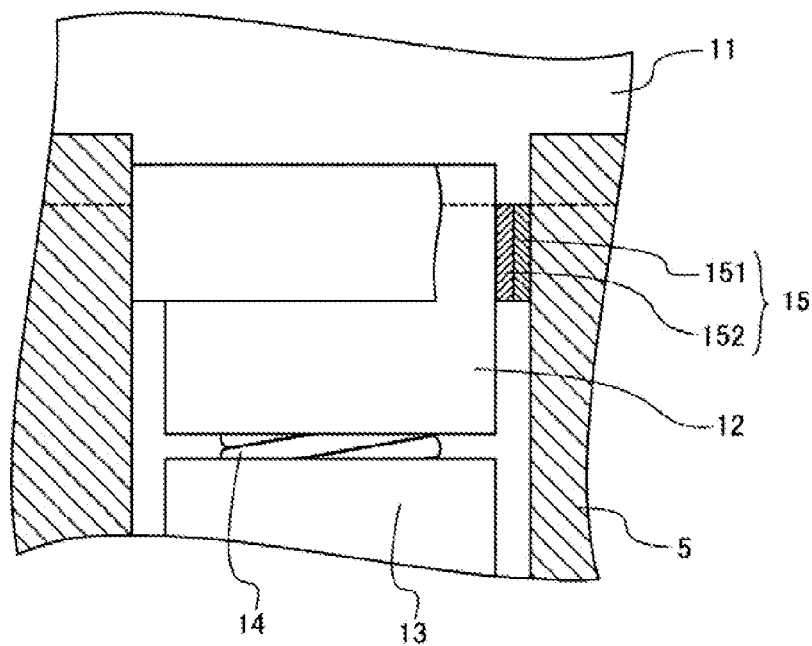
FIG. 3A is a schematic cross-sectional view illustrating the steering device illustrated in FIG. 1 before a steering operation.
Figure 3B:
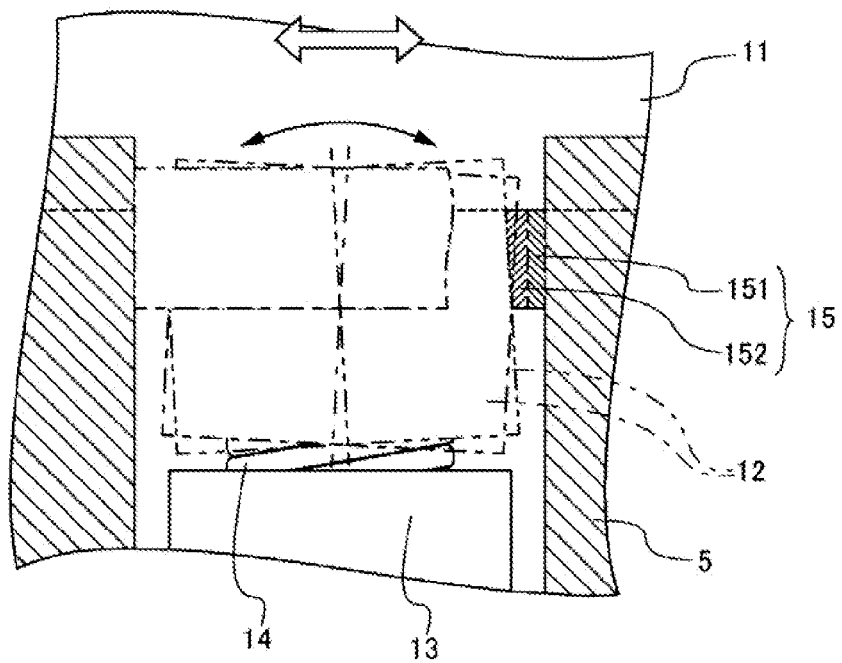
FIG. 3B is a schematic cross-sectional view illustrating the steering device illustrated in FIG. 1 during a steering operation.

FIGS. 3A and 3B are illustrated as schematic partial cross-sectional views of each member illustrated in FIG. 2 as seen from a viewpoint that intersects perpendicularly to the axes of the rack shaft 11 and the rack guide 12 in the guide housing 5, so that the motions of the rack shaft 11 and the rack guide 12 are easily understood. FIG. 3A is a schematic partial cross-sectional view illustrating the steering device 1 in an initial state before a steering operation. FIG. 3B is a schematic partial cross-sectional view illustrating the steering device 1 during a steering operation. Note that, although the pinion shaft 2 is not illustrated in FIGS. 3A and 3B, it extends perpendicularly to the drawing sheet, and is disposed above the rack shaft 11.

As illustrated in FIG. 3A, the buffer member 15 is formed so as to conform to the shape of the outer circumferential surface of one end part of the rack guide 12. That is, since one end part of the rack guide 12 is formed in a curved surface along the outer circumferential surface of the rack shaft 11, and an end part of the buffer member 15 on the rack shaft 11 side is formed along the external shape of the rack guide 12, one end part of the buffer member 15 has a shape along the outer circumferential surface of the rack shaft 11. The buffer member 15, the cylindrical member 151, and the elastic member 152 are examples of a buffer member, a cylindrical member, and an elastic member of the steering device according to the present disclosure.

The inner diameter of the elastic member 152 is preferably formed slightly smaller than or equal to the outer diameter of the rack guide 12. Once the buffer member 15 having the elastic member 152 of such a inner diameter is disposed in contact with the outer circumferential surface of the rack guide 12, the elastic member 152 serves as a slip prevention to prevent a slip of the buffer member 15 when an input of a steering operation, vibration and impacts during traveling, etc. occur.

Next, FIG. 3B illustrates the steering device 1 in a state in which a steering operation is performed. Behavior of each member illustrated in FIGS. 2 and 3A during the steering operation is as follows.

First, the steering wheel is rotated. When the steering wheel is rotated, the steering column and the suitable coupling member transmit their rotation to the pinion shaft 2 illustrated in FIG. 2. The pinion shaft 2 to which the rotation is transmitted rotates about the axis as a center. When the pinion shaft 2 is rotated, the pinion 9 rotates. When the pinion 9 is rotated, the torque is transmitted to the rack 10 that engages with the pinion 9. When the torque is transmitted to the rack 10, the rack shaft 11 where the rack 10 is formed is pushed rightward or leftward of the vehicle body along its axis. When the rack shaft 11 is moved along its axis, the rack guide 12 that presses the rack 10 against the pinion 9 receives friction from the outer circumferential surface of the rack shaft 11. Thereby, an end part of the rack guide 12 on the pinion 9 side follows the motion of the rack shaft 11. That is, the rack guide 12 is pulled by the rack shaft 11 with the frictional force, and the end of the rack guide 12 on the pinion shaft 2 and the rack shaft 11 side inclines from the initial state illustrated in FIG. 3A in the same direction as the moving direction of the rack shaft 11. As illustrated by chain lines and two-dot chain lines in FIG. 3B, the rack guide 12 can follow the motion of the rack shaft 11 and incline within the guide housing 5.

As illustrated in FIG. 3B, the rack shaft 11 moves in a white-arrow direction by the steering operation. When the rack shaft 11 moves, the rack guide 12 inclines within the guide housing 5 from the initial state illustrated in FIG. 3A. Note that the rack guide 12 is pivotable in various directions using an intersection between the contact surface of the rack guide 12 and the coil spring 14 which are illustrated in FIG. 2, and the axis of the rack guide 12, as a fulcrum.

Here, behavior of a conventional rack guide and its peripheral members are described. If the rack guide 12 is simply disposed inside the guide housing 5 and biased by the coil spring 14 without providing the buffer member 15, a degree of freedom in the behavior of the rack guide 12 within the guide housing 5 increases. That is, the rack guide 12 easily inclines as it follows the motion of the rack shaft 11. If the rack guide 12 is easy to follow the motion of the rack shaft 11, part of the rack guide 12 may strongly contact the inner circumferential surface of the guide housing 5, for example, when the rack shaft 11 moves greatly or rapidly. Noise may be generated by this contact. In order to prevent the noise, an O-ring is conventionally provided so that the rack guide 12 does not incline too much within the guide housing 5.

Note the, when a steering operation is started, it is necessary to incline the rack guide 12 while radially compressing the O-ring against the elastic force of the O-ring. That is, since the modulus of elasticity of the O-ring becomes smaller as the cross-section diameter of the O-ring also becomes smaller, the required stress for radially compressing the O-ring against the elastic force becomes smaller. Therefore, the stress required for the initial movement of the steering operation becomes desirably smaller if the cross-section diameter of the O-ring is smaller. On the contrary, since the modulus of elasticity of the O-ring becomes larger as the cross-section diameter of the O-ring becomes larger, the required stress for radially compressing the O-ring against the elastic force becomes larger. Therefore, the stress required for the initial movement of the steering operation becomes larger if the cross-section diameter of the O-ring is larger.

Conventionally, the behavior of the rack guide 12 within the guide housing 5 may vary according to the type of the steering operation. Instances of the steering operation that cause differences in the behavior of the rack guide 12 include produces turning back and turning of the steering operation. In particular, one instance of the turning back is such that, from a state in which the steering wheel is turned to the left, the steering wheel is then turned to the right until returning to the initial position at which the vehicle can travel straight and, then, is immediately turned again to the left to obtain a state in which the steering wheel is turned to the left. One instance of the turning is such that, from a state in which the steering wheel is turned to the right, the steering wheel is turned to the left until returning to the initial position at which the vehicle can travel straight and, then, is immediately turned again to the left to obtain a state in which the steering wheel is turned to the left.

Conventionally, upon performing the turning back, in the state in which the steering wheel is first turned to the left, the rack guide 12 that followed the motion of the rack shaft 11 and inclined has been returned to the initial position by the elastic force of the O-ring acting within the guide housing 5. If the steering wheel is returned to the initial position from that state, the rack guide 12 follows the motion of the rack shaft 11 and inclines, for example, to the right. Further, before the rack guide 12 returns to the initial position, if the steering wheel is immediately turned to the left, the rack guide 12 that inclined to the right inclines to the left. Thereby, the rack guide 12 may return to the initial position, or may slightly incline to the left with respect to the initial position. Since the rack guide 12 does not present problematic behavior in particular at this time, the steering feel does not change on the way.

Conventionally, upon performing the turning, in the state in which the steering wheel is first turned to the right, the rack guide 12 which followed the motion of the rack shaft 11 and inclined has been returned to the initial position by the elastic force of the O-ring acting within the guide housing 5. If the steering wheel is returned to the initial position from that state, the rack guide 12 follows the motion of the rack shaft 11 and inclines to the left. Further, before the rack guide 12 returns to the initial position, if the steering wheel is immediately turned to the left, the rack guide 12 which inclined to the left further inclines to the left. The rack guide 12 which inclined too much in one direction may contact the inner circumferential surface of the guide housing 5. The noise is generated at this time, as described above. Since the inclination of the rack guide 12 is stopped on the way when the guide housing 5 contacts the rack guide 12 in the middle of the steering operation, the frictional force that acts on the contacting part of the rack shaft 11 and the rack guide 12 may vary. Thereby, the steering feel changes on the way. In particular, if the O-ring having the circular cross-section is used like the conventional structure, the rack guide 12 is easily inclines if the cross-sectional diameter of the O-ring is too small. Therefore, the rack guide 12 easily contacts the inner circumferential surface of the guide housing 5 if the turning of the steering operation is performed. Thus, the stress required for the initial movement of the steering operation can be reduced as described above, but the generation of noise when performing the turning, and the change of steering feel in the middle of steering are easy to occur.

In the type of the steering operation described above, the operation of turning the steering wheel, for example, to left is common in the turning back and the turning. However, in the previous steering operation in which the steering wheel is once returned to the initial position to make the vehicle into the straight-traveling state, the steering direction of the steering wheel is different in the turning back and the turning. That is, even if the steering operation is performed to the same direction like the turning back and the turning, a difference may be caused in the steering feel depending on the previous steering operation, regardless of the vehicle being in the straight-traveling state that is common in both the operations, because the state of the rack guide 12 is different in these operations.

Figure 4:
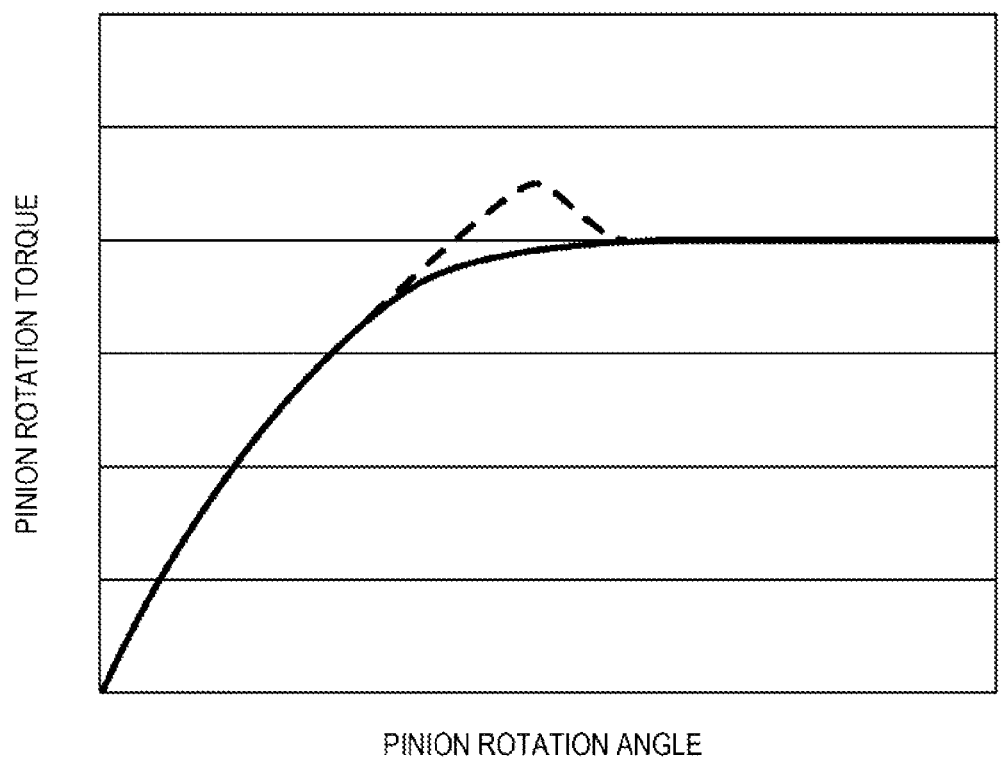
FIG. 4 is a graph illustrating a relation between a pinion rotation angle and a pinion rotation torque during a steering operation.

FIG. 4 is a graph illustrating a relation between a pinion rotation angle and a pinion rotation torque. This relation is similar to the relation between a rotation angle of the steering wheel and a torque required for a steering operation, for example. That is, when the pinion begins to rotate by beginning to rotate the steering wheel, the rack shaft begins to move by the engagement of the pinion and the rack. Even if the rack shaft begins to move, static friction force is acting in the state in which the rack guide is following and inclining since the rack shaft and the rack guide contacts at the same parts. When the pinion rotation torque is further and additionally inputted by continuing the steering operation, the stress that exceeds the static friction force is inputted into the rack shaft. Thereby, the rack shaft begins to slide on the surface of the rack guide. That is, the pinion rotation torque changes from the static friction force to the magnitude equivalent to a dynamic friction force. Once the pinion rotation torque or the torque required for the steering operation becomes equivalent to the dynamic friction force, a subsequent torque becomes substantially constant and remains equivalent to the dynamic friction force.

When the conventional O-ring is used, the pinion rotation torque may once overshoot as illustrated by a dashed line in the graph of FIG. 4 when the rack shaft begins to slide on the surface of the rack guide, as compared with an ideal case illustrated by a solid line in the same graph. In particular, since the torque required for the rotation decreases to the magnitude equivalent to the dynamic friction force if the pinion rotation angle is increased to a certain angle (i.e., if the steering wheel is rotated to a certain angle), the steering wheel may become rotatable without much resistance.

In particular, if the conventional O-ring having a larger cross-section diameter is used, since the rack guide does not incline easily due to the large modulus of elasticity of the O-ring, the pinion rotation torque of the magnitude equivalent to the static friction force is needed from the phase where the pinion rotation angle is small. If the rack guide easily inclines, a torque inputted by the steering operation is absorbed to some extent by the inclination of the rack guide as the pinion rotation torque is increased, and when the rack shaft begins to slide on the surface of the rack guide after the rack guide inclines to a limit, the pinion rotation torque changes from the static friction force to the necessary torque equivalent to the dynamic friction force. However, if the rack guide is made difficult to incline by increasing the cross-section diameter of the O-ring, since the torque inputted by the steering operation is not absorbed to some extent by the inclination of the rack guide, and the magnitude of the necessary torque changes suddenly from the static friction force to the dynamic friction force, the torque overshoot as illustrated by the dashed line in the graph of FIG. 4 is often caused.

Note that, in an actual case, when the magnitude of the necessary torque changes from the static friction force to the dynamic friction force as described above, a torque that is slightly larger than the pinion rotation torque required for an ideal steering operation is needed in many cases. Therefore, since the degree of the steering wheel rotation without resistance is small, minute uncomfortable steering feel may be sensed during the steering operation though it is not reduce the safety, such as an erroneous steering operation. This leads to lowering of the smoothness of the steering operation.

As described above, the O-ring is provided and various troubles may be caused only by adjusting the cross-sectional diameter in the conventional structure; however, in the steering device 1 that is one example of the present disclosure, since the buffer member 15 is provided, it does not cause or it is difficult to cause these troubles.

When the rack guide 12 inclines, the cylindrical member 151 of the buffer member 15 is partially pressed by the elastic member 152. Thus, the outer circumferential surface of the cylindrical member 151 maintains contact with the inner circumferential surface of the guide housing 5, and the deformation and movement of the cylindrical member 151 is not caused or is difficult to be caused. Further, the inner circumferential surface of the elastic member 152 of the buffer member 15 maintains contact with the outer circumferential surface of the rack guide 12, and the elastic member 152 deforms according to the inclination of the rack guide 12.

Since the buffer member 15 has the elastic member 152, the rack guide 12 can follow to the motion of the rack shaft 11 and incline, while radially compressing the elastic member 152. That is, the rack guide 12 is permitted by the elastic member 152 of the buffer member 15 to incline to some extent while following the motion of the rack shaft 11. Thereby, the magnitude of the pinion rotation torque can be smoothly shifted from the static friction force to the dynamic friction force, and the overshoot of the pinion rotation torque illustrated in FIG. 4 by the dashed line is not caused or it is difficult to be caused. Thus, the steering device 1 does not disturb the smooth steering operation.

When the rack guide 12 inclines while following the motion of the rack shaft 11, the rack guide 12 is easier to return to the initial position by the elastic force of the elastic member 152 even if the rack shaft 11 is stopped at the position after it is moved when the steering operation is suspended. Thus, when either one of the turning and the tuning back of the steering operation is performed, the steering feel is constant because the rack guide 12 returns to the initial position promptly and correctly even if it inclines. Therefore, the steering device 1 provided with the buffer member 15 having the elastic member 152 does not cause or is difficult to cause the difference in steering feel between the turning and the turning back of the steering operation.

Further, the cylindrical member 151 of the buffer member 15 narrows down the movable range of the rack guide 12 to substantially regulate the movable range. The part that moves most greatly when the rack guide 12 inclines is part that is most distant from the center of the inclination of the rack guide 12, i.e., the pivot center of the rack guide 12 described above, and is near the contacting part of the rack guide 12 with the rack shaft 11. Since the cylindrical member 151 is provided near the contacting part, the elastic member 152 can only be radially compressed down to the inner circumferential surface of the cylindrical member 151 at the maximum. Thereby, an excessive inclination of the rack guide 12 can be prevented. That is, by providing the cylindrical member 151, the gap between the guide housing 5 and the rack guide 12 can be narrowed to substantially regulate the movable range of the rack guide 12. Since it is difficult to cause the overshoot illustrated by the dashed line in the graph of FIG. 4 if the movable range of the rack guide 12 is suitable, the smooth steering operation becomes possible. Further, even if a design change of the members, such as the rack guide 12, the coil spring 14, the guide housing 5, the pinion shaft 2, and the rack shaft 11, is made to change the sizes and the shapes of the members, the control of steering feel is still easy because the movable range of the rack guide can be selected based on the thickness of the cylindrical member. Note that the rack guide 12 will not contact the inner circumferential surface of the guide housing 5 by providing the cylindrical member 151 and, thus, the noise will not be generated.

The behavior of the rack guide 12 when the rack shaft 11 moves can be brought closer to the ideal condition because the rack guide 12 easily follows the motion of the rack shaft 11 and the rack guide 12 easily returns to the initial position. Therefore, by providing the buffer member 15, the relation between the pinion rotation angle and the pinion rotation torque as illustrated in the graph of FIG. 4 can be brought closer to the state illustrated by the solid line from the state illustrated by the dashed line.

Note that the permitted inclination range of the rack guide 12 can be selected considering the frictional force that acts between the rack shaft 11 and the rack guide 12, the size of the gap between the outer circumferential surface of the rack guide 12 and the inner circumferential surface of the guide housing 5, the moving speed of the rack shaft 11, and the vibration and the impact that act to the steering device 1 during traveling, etc. The thickness of the cylindrical member 151 in the radial direction of the buffer member 15, the thickness of the elastic member 152, the material of the elastic member 152, etc. may be determined suitably based on the inclination range of the rack guide 12. The thickness of the cylindrical member 151 may be determined based on the inclination range of the rack guide 12 such that the pinion rotation torque can be smoothly shifted to the dynamic friction force from the static friction force. Further, the thickness of the elastic member 152 may be determined such that the rack guide 12 can incline appropriately and the elastic member 152 can achieve the elastic force that is easy to return the rack guide 12 to the initial position even if the rack guide 12 inclines.

Figure 5A:
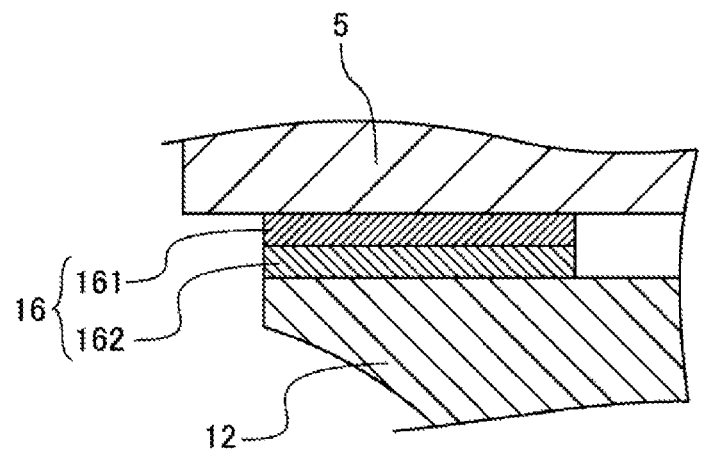
FIGS. 5A and 5B are partially enlarged cross-sectional views illustrating modifications of a buffer member according to the present disclosure.
Figure 5B:
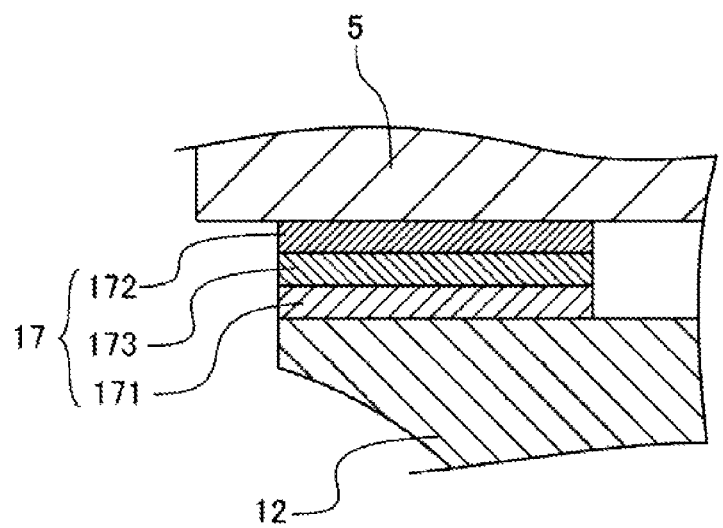
Figure 6C:
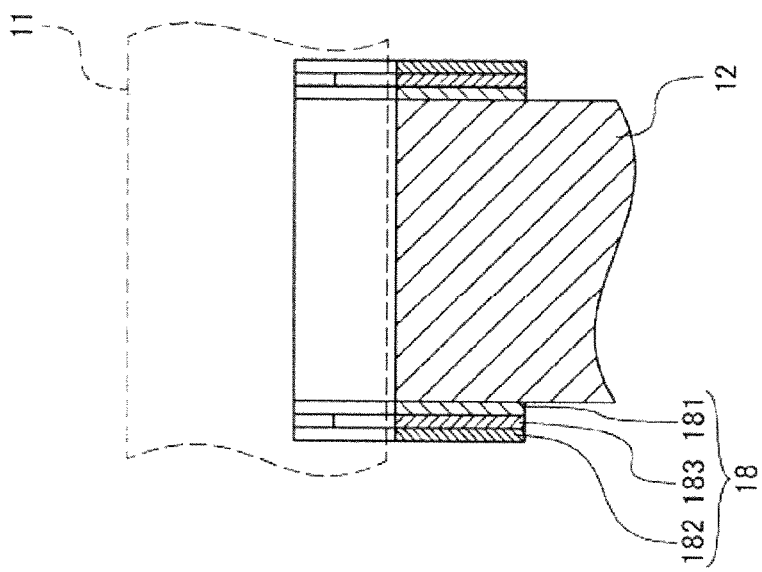
FIGS. 6A to 6C are diagrams illustrating modifications of the buffer member according to the present disclosure, where
Figure 6B:
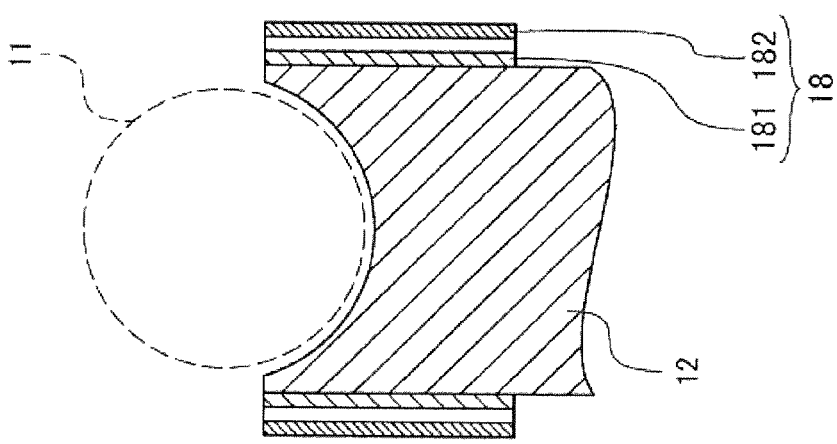
Figure 6A:
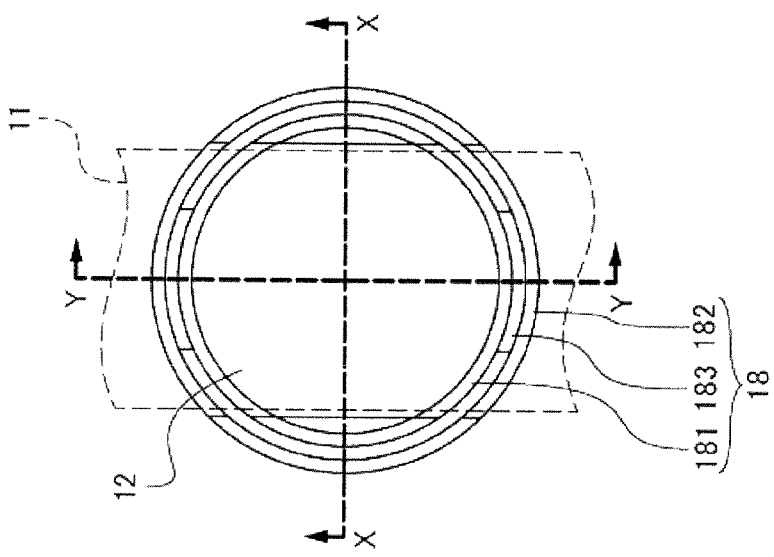

FIGS. 5A and 5B, and FIGS. 6A to 6C illustrate various modifications of the buffer member according to the present disclosure. FIGS. 5A and 5B illustrate enlarged views of the buffer member and its peripheral members. FIGS. 6A to 6C illustrate parts of the buffer member, the rack guide, and the rack shaft. Note that, since the rack guide, the guide housing, the rack shafts, etc. other than the buffer member which are illustrated in FIGS. 5A and 5B, and FIGS. 6A to 6C use the same member as the rack guide 12, the guide housing 5, and the rack shaft 11 which are illustrated in FIG. 2, and FIGS. 3A and 3B, the same referential numerals are assigned and, thus, detailed description of these same members are omitted. Note that, although not illustrated in FIGS. 5A and 5B, and FIGS. 6A to 6C, the left side of FIGS. 5A and 5B is a pinion shaft and rack shaft side, and a side closer to the viewer of FIG. 6A and an upper side of FIGS. 6B and 6C is a pinion shaft side.

In the example illustrated in FIG. 5A, a buffer member 16 is disposed between the outer circumferential surface of the rack guide 12 and the inner circumferential surface of the guide housing 5. The buffer member 16 has a form in which the positions of the cylindrical member 151 and the elastic member 152 of the buffer member 15 are exchanged. That is, the buffer member 16 has an elastic member 161 and a cylindrical member 162, and the elastic member 161 is mounted to the outer circumferential surface of the cylindrical member 162 by a fixing method, such as the vulcanization adhesion. The buffer member 16 contacts the outer circumferential surface of the rack guide 12 at the inner circumferential surface of the cylindrical member 162, and contacts the inner circumferential surface of the guide housing 5 at the outer circumferential surface of the elastic member 161.

In the example illustrated in FIG. 5B, a buffer member 17 is disposed between the outer circumferential surface of the rack guide 12 and the inner circumferential surface of the guide housing 5. The buffer member 17 has a first small-diameter cylindrical member 171 and a second large-diameter cylindrical member 172. The first cylindrical member 171 is inserted into the second cylindrical member 172, and the elastic member 173 is mounted by a fixing method, such as the vulcanization adhesion, between the outer circumferential surface of the first cylindrical member 171 and the inner circumferential surface of the second cylindrical member 172. The buffer member 17 contacts the outer circumferential surface of the rack guide 12 at the inner circumferential surface of the first cylindrical member 171, and contacts the inner circumferential surface of the guide housing 5 at the outer circumferential surface of the second cylindrical member 172.

Since the buffer member 16 has the elastic member 161 and the buffer member 17 has the elastic member 173, the rack guide 12 can follow the motion of the rack shaft 11 to incline, while radially compressing the elastic member 161 or 173 via the cylindrical member 162 or the first cylindrical member 171, respectively. That is, the rack guide 12 is permitted by the elastic member 161 or 173 to incline to some extent while following the motion of the rack shaft 11. Thereby, the magnitude of the pinion rotation torque can be smoothly shifted from the static friction force to the dynamic friction force, and the overshoot of the pinion rotation torque illustrated in FIG. 4 by the dashed line is not caused or it is difficult to be caused. Thus, the steering device 1 does not disturb the smooth steering operation.

When the rack guide 12 inclines while following the motion of the rack shaft 11, the rack guide 12 is easier to return to the initial position by the elastic force of the elastic member 161 or 173 even if the rack shaft 11 is stopped at the position after it is moved when the steering operation is suspended. Thus, when either one of the turning and the turning back of the steering operation is performed, the steering feel is constant because the rack guide 12 returns to the initial position promptly and correctly even if it inclines. Therefore, the steering device 1 provided with the buffer member 16 having the elastic member 161 or the buffer member 17 having the elastic member 173 does not cause or is difficult to cause the difference in steering feel between the turning and the turning back of the steering operation.

When the rack guide 12 inclines, the cylindrical member 162 and the first cylindrical member 171 maintains the state in which the inner circumferential surface thereof contacts the outer circumferential surface of the rack guide 12, and the deformation and movement of the cylindrical member 162 and the first cylindrical member 171 is not caused or is difficult to be caused. Further, the second cylindrical member 172 of the buffer member 17 is partially pressed by the elastic member 173. Thus, the outer circumferential surface of the second cylindrical member 172 maintains contact with the inner circumferential surface of the guide housing 5, and the deformation and movement of the second cylindrical member 172 is not caused or is difficult to be caused. The elastic members 161 and 173 maintain the state in which the inner circumferential surfaces thereof contact the outer circumferential surfaces of the cylindrical member 162 and the first cylindrical member 171, and deforms according to the inclination of the rack guide 12.

Further, the cylindrical member 162 of the buffer member 16, and the first cylindrical member 171 and the second cylindrical member 172 of the buffer member 17 narrows down the movable range of the rack guide 12 to substantially regulate the movable range. The part that moves most greatly when the rack guide 12 inclines is part that is most distant from the center of the inclination of the rack guide 12, i.e., the pivot center of the rack guide 12 described above, and is near the contacting part of the rack guide 12 with the rack shaft 11. Since the cylindrical member 162, the first cylindrical member 171, and the second cylindrical member 172 are provided near the contacting part, the elastic members 161 and 173 can only be radially compressed down to the inner circumferential surfaces of the cylindrical member 162 and the second cylindrical member 172 at the maximum. Thereby, an excessive inclination of the rack guide 12 can be prevented. That is, by providing the cylindrical member 162, the first cylindrical member 171, and the second cylindrical member 172, the gap between the guide housing 5 and the rack guide 12 can be narrowed to substantially regulate the movable range of the rack guide 12. If the movable range of the rack guide 12 is suitable, the rack guide 12 will not incline too much and it becomes difficult to cause the overshoot illustrated by the dashed line in the graph of FIG. 4. Thus, the smooth steering operation becomes possible.

Further, even if a design change of the rack guide 12 and its peripheral members is made to change the sizes and the shapes of the rack guide 12 and the members, the control of steering feel is still easy because the movable range of the rack guide 12 can be selected based on the thicknesses of the cylindrical member 162, the first cylindrical member 171, and the second cylindrical member 172. Note that the rack guide 12 will not contact the inner circumferential surface of the guide housing 5 by providing the cylindrical member 162, the first cylindrical member 171, and the second cylindrical member 172 and, thus, the noise will not be generated.

In the example illustrated in FIGS. 5A and 5B, the behavior of the rack guide 12 when the rack shaft 11 moves can be brought closer to the ideal condition because the rack guide 12 easily follows the motion of the rack shaft 11 and the rack guide 12 easily returns to the initial position. Therefore, by providing the buffer member 16 or 17, the relation between the pinion rotation angle and the pinion rotation torque as illustrated in the graph of FIG. 4 can be brought close to the state illustrated by the solid line from the state illustrated by the dashed line.

Next, the example illustrated in FIGS. 6A to 6C is specialized in that the rack guide 12 moves to follow the motion of the rack shaft 11 along the axis of the rack shaft 11.

The difference between the example illustrated in FIGS. 6A to 6C and the example illustrated in FIG. 5B is the shape of the elastic member. Note that the rack shaft 11 that is pressed by the rack guide 12 is illustrated by dashed lines in FIGS. 6A to 6C for easier visual recognition of the shapes of the rack guide 12 and a buffer member 18. FIG. 6A is a schematic diagram of the rack guide 12 and buffer member 18 as seen from one end face of the rack guide 12 on the rack shaft 11 side. FIG. 6B is a partially enlarged cross-sectional view of the rack guide 12 and the buffer member 18 illustrated in FIG. 6A, when cut along a line X-X. FIG. 6C is a partially enlarged cross-sectional view of the cutting rack guide 12 and the buffer member 18 illustrated in FIG. 6A, when cut along a line Y-Y.

As illustrated in FIG. 6A, the buffer member 18 has a first small-diameter cylindrical member 181 and a second large-diameter cylindrical member 182. The first cylindrical member 181 is inserted into the second cylindrical member 182, and the elastic member 183 is mounted to part between the outer circumferential surface of the first cylindrical member 181 and the inner circumferential surface of the second cylindrical member 182 by a fixing method, such as the vulcanization adhesion. The elastic member 183 does not have a cylindrical shape, but has a plate shape along part of the outer circumferential surface of the rack guide 12. The buffer member 18 contacts the outer circumferential surface of the rack guide 12 at the inner circumferential surface of the first cylindrical member 181, and contacts the inner circumferential surface of the guide housing at the outer circumferential surface of the second cylindrical member 182. As illustrated particularly in FIGS. 6A and 6C, the elastic member 183 is disposed on the outer circumferential surface of the rack guide 12 so that it includes part that intersects perpendicularly to the axial direction of the rack shaft 11.

Since the buffer member 18 has the elastic member 183, the rack guide 12 can follow the motion of the rack shaft 11 to incline while radially compressing the elastic member 183 via the first cylindrical member 181. In particular, since the elastic member 183 is disposed so that it includes the part of the outer circumferential surface of the rack guide 12 that intersects perpendicularly to the direction along the axial direction of the rack shaft 11, and where the rack guide 12 may move most probably, the elastic member 183 is compressed certainly when the rack guide 12 follows the rack shaft 11 and inclines. The rack guide 12 is permitted by the elastic member 183 to incline to some extent while following the motion of the rack shaft 11. Thereby, the magnitude of the pinion rotation torque can be smoothly shifted from the static friction force to the dynamic friction force, and the overshoot of the pinion rotation torque illustrated in FIG. 4 by the dashed line is not caused or it is difficult to be caused. Thus, the steering device 1 does not disturb the smooth steering operation.

When the rack guide 12 inclines while following the motion of the rack shaft 11, the rack guide 12 is easier to return to the initial position by the elastic force of the elastic member 183 even if the rack shaft 11 is stopped at the position after it is moved when the steering operation is suspended. Thus, when either one of the turning and the turning back of the steering operation is performed, the steering feel is constant because the rack guide 12 returns to the initial position promptly and correctly even if it inclines. Therefore, the steering device 1 provided with the buffer member 18 having the elastic member 183 does not cause or is difficult to cause the difference in steering feel between the turning and the turning back of the steering operation.

When rack guide 12 inclines, the first cylindrical member 181 maintains the state in which the inner circumferential surface thereof contacts the outer circumferential surface of the rack guide 12, and the deformation and movement of the first cylindrical member 181 is not caused or is difficult to be caused. Further, the second cylindrical member 182 is partially pressed by the elastic member 183. Thus, the outer circumferential surface of the second cylindrical member 182 maintains contact with the inner circumferential surface of the guide housing, and the deformation and movement of the second cylindrical member 182 is not caused or is difficult to be caused. The elastic member 183 maintains the state in which the inner surface thereof contacts the outer circumferential surface of the first cylindrical member 181, and deforms according to the inclination of the rack guide 12.

Further, the first cylindrical member 181 and the second cylindrical member 182 of the buffer member 18 narrows down the movable range of the rack guide 12 to substantially regulate the movable range. The part that moves most greatly when the rack guide 12 inclines is part which is most distant from the center of the inclination of the rack guide 12, i.e., the pivot center of the rack guide 12 described above, and is particularly near the contacting part of the rack guide 12 with the rack shaft 11. Since the first cylindrical member 181 and the second cylindrical member 182 are provided near the contacting part, the elastic member 183 can only be radially compressed down to the inner circumferential surface of the second cylindrical member 182 at the maximum. Thereby, an excessive inclination of the rack guide 12 can be prevented. That is, by providing the first cylindrical member 181 and the second cylindrical member 182, the gap between the guide housing 5 and the rack guide 12 can be narrowed to substantially regulate the movable range of the rack guide 12. If the movable range of the rack guide 12 is suitable, the rack guide 12 will not incline too much and it becomes difficult to cause the overshoot illustrated by the dashed line in the graph of FIG. 4. Thus, the smooth steering operation becomes possible.

Further, even if a design change of the rack guide 12 and its peripheral members is made to change the sizes and the shapes of the rack guide 12 and the members, the control of steering feel is still easy because the movable range of the rack guide 12 can be selected based on the thicknesses of the first cylindrical member 181 and the second cylindrical member 182. Note that the rack guide 12 will not contact the inner circumferential surface of the guide housing by providing the first cylindrical member 181 and the second cylindrical member 182 and, thus, the noise will not be generated.

In the example illustrated in FIGS. 6A to 6C, the behavior of the rack guide 12 when the rack shaft 11 moves can be brought closer to the ideal condition because the rack guide 12 easily follows the motion of the rack shaft 11 and the rack guide 12 easily returns to the initial position. Therefore, by providing the buffer member 18, the relation between the pinion rotation angle and the pinion rotation torque as illustrated in the graph of FIG. 4 can be brought close to the state illustrated by the solid line from the state illustrated by the dashed line.

As described above, the buffer member 18 can support the rack guide 12 in the axial direction of the rack shaft 11. That is, the buffer member 18 can selectively support the part where the rack guide 12 easily inclines.

In the conventional example in which the O-ring is provided, the O-ring needs to be disposed so as to surround the outer circumferential surface of the rack guide. Since the vicinity of the contacting part of the rack guide with the rack shaft is often formed in a curved surface along the outer circumferential surface of the rack shaft, the O-ring that surrounds the outer circumferential surface of the rack guide cannot be disposed in the vicinity of the contacting part. On the other hand, in the steering device according to the present disclosure, the shapes of each cylindrical member and each elastic member can be suitably formed so as to conform to the shape of the contacting part of the outer circumferential surface of the rack guide with the rack shaft, similar to the buffer members 15, 16, and 17. In addition, in a case in which the support of the rack guide along the axis of the rack shaft is necessary to be realized, it is unnecessary to form the elastic member in the cylindrical shape like the buffer member 18, but the elastic member having, for example, a plate shape or rod shape, is disposed in part of the rack guide to be supported. Therefore, the steering device according to the present disclosure can adopt the optimal supporting structure of the rack guide based on the range and direction of the movement of the rack guide, if the range and direction are determined. Thus, the steering device according to the present disclosure is preferable since the degree of freedom in its design is high.

Note that the vicinity of the contacting part of the rack guide with the rack shaft is preferably easy to incline while following the motion of the rack shaft. In the present disclosure, since the first elastic member and the second elastic member having a smaller modulus of elasticity than the first elastic member are provided as the elastic member, and the second elastic member is disposed on the pinion shaft side and the rack shaft side with respect to the first elastic member, the rack guide easily inclines while following the motion of the rack shaft. The first elastic member and the second elastic member may be formed integrally, for example, by two-color molding, or may be formed separately.

According to the present disclosure, since the buffer member has the elastic member, the rack guide can incline at the pinion shaft side and the rack shaft side within the guide housing. Thus, when the rack shaft moves in the axial directions thereof during a steering operation, the rack guide biased by the rack shaft can follow the motion of the rack shaft. Therefore, the steering device which does not disturb a smooth steering operation can be provided. Further, since the buffer member has the cylindrical member according to the present disclosure, the rack guide does not incline too much and is easy to return to the initial position by the elastic force of the elastic member. Therefore, the steering device which does not cause or is difficult to cause the difference in steering feel between the turning and the turning back of the steering operation can be provided.

Although the example to which the invention made by the present inventors are applied is described above, the present disclosure is not intended to be limited by the description and the drawings of the example which constitutes part of the present disclosure. That is, it is additionally noted that all of other examples, instances, operation techniques, etc. that may be implemented by the person skilled in the art based on the example encompass the scope of the claims of the present disclosure.

Further, in the foregoing specification, specific examples of the present disclosure have been described. However, one of ordinary skill in the technique appreciates that various modifications and changes can be performed without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A steering device comprising:
   a rack;
   a pinion;
   a pinion shaft that has the pinion on an outer circumferential surface thereof;
   a rack shaft that has the rack that engages with the pinion;
   a rack guide that is provided on a side of the rack shaft opposite from the pinion shaft and guides the rack shaft along an axis of the rack shaft;
   a biasing member that biases the rack guide against the rack shaft to press the rack against the pinion;
   a guide housing that accommodates the rack guide and the biasing member; and
   a buffer member that is provided between an outer circumferential surface of the rack guide and an inner circumferential surface of the guide housing, wherein
   the buffer member has a cylindrical member and an elastic member, the elastic member being disposed on at least either one of an inner circumferential surface and an outer circumferential surface of the cylindrical member; and
   the elastic member includes a first elastic member, and a second elastic member having an modulus of elasticity smaller than that of the first elastic member, and the second elastic member is disposed on the pinion shaft side and the rack shaft side with respect to the first elastic member.

2. The steering device of claim 1, wherein the elastic member is disposed such that the elastic member contacts each of the inner circumferential surface of the cylindrical member and the outer circumferential surface of the rack guide.

3. The steering device of claim 1, wherein
   the elastic member is disposed such that the elastic member contacts the outer circumferential surface of the cylindrical member; and
   the inner circumferential surface of the cylindrical member is disposed so as to contact the outer circumferential surface of the rack guide.

4. The steering device of claim 1, wherein
   the cylindrical member has a first small-diameter cylindrical member and a second large-diameter cylindrical member, the first cylindrical member being disposed inside the second cylindrical member; and
   the elastic member is disposed between an outer circumferential surface of the first cylindrical member and an inner circumferential surface of the second cylindrical member.

5. The steering device of claim 1, wherein the elastic member is disposed at one end of a contacting part of the rack guide with the rack shaft.

6. The steering device of claim 2, wherein the elastic member is disposed at one end of a contacting part of the rack guide with the rack shaft.

7. The steering device of claim 3, wherein the elastic member is disposed at one end of a contacting part of the rack guide with the rack shaft.

8. The steering device of claim 4, wherein the elastic member is disposed at one end of a contacting part of the rack guide with the rack shaft.

9. The steering device of claim 1, wherein the elastic member is disposed along an axis of the rack guide.

10. The steering device of claim 2, wherein the elastic member is disposed along an axis of the rack guide.

11. The steering device of claim 3, wherein the elastic member is disposed along an axis of the rack guide.

12. The steering device of claim 4, wherein the elastic member is disposed along an axis of the rack guide.

* * * * *